L. CHOLET.
PICTURE MOLDING.
APPLICATION FILED APR. 10, 1908.
931,566.
Patented Aug. 17, 1909.
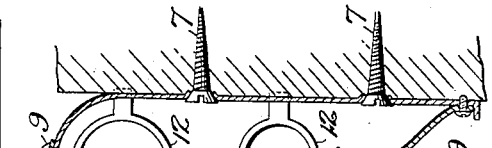
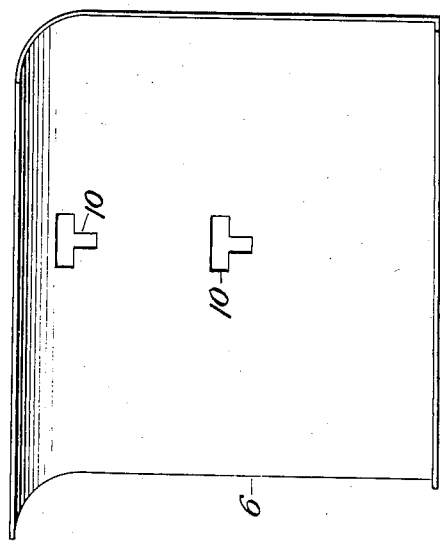
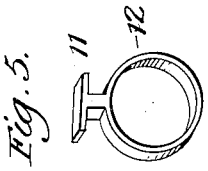
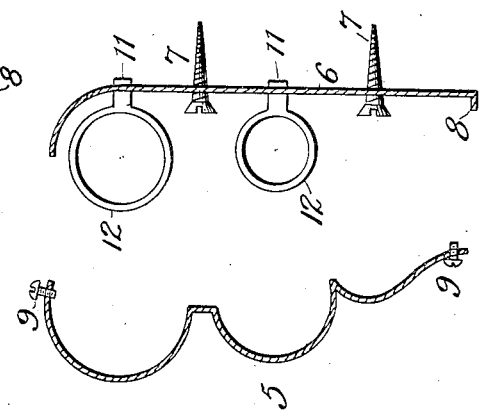
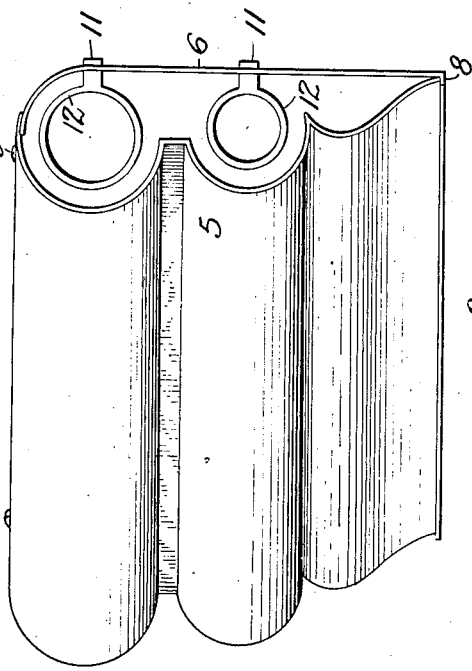
WITNESSES
INVENTOR
Leon Cholet,
BY
ATTORNEY

UNITED STATES PATENT OFFICE.

LEON CHOLET, OF NEW YORK, N. Y.

PICTURE-MOLDING.

No. 931,566.     Specification of Letters Patent.     Patented Aug. 17, 1909.

Application filed April 10, 1908. Serial No. 426,302.

*To all whom it may concern:*

Be it known that I, LEON CHOLET, a citizen of the United States of America, residing at New York, in the county of New York and State of New York, have invented new and useful Improvements in Picture-Molding, of which the following is a specification.

This invention relates to picture molding and more especially to molding adapted to be utilized for additional purposes such as the passage therethrough of electric wires, supporting means being provided and the molding adapted to be separated so that the wire may be readily removed, spliced or repaired. These and other details of the invention will be more fully described and its object explained in the following specification, set forth in the claims and illustrated in the drawings, where:

Figure 1 is a perspective view of a portion of the molding. Fig. 2 is a perspective view of the rear section of the molding. Fig. 3 is a cross sectional view of the molding with its parts separated. Fig. 4 is a similar view with the parts assembled. Fig. 5 is a detail view.

The molding is made up of strips of sheet metal of desired lengths and is composed of two sections 5 and 6, the outer section 5 being of ornamental nature similar to the common form of picture molding or adapted to be painted or otherwise decorated. The rear section 6 is preferably flat to secure the complete molding to the wall which is done by means of nails or the screws 7 while the upper edge is turned forward to meet a corresponding condition on the section 5. The lower edge of this rear section has the off set 8 on which rests the lower edge of the front section and the two sections are then secured together by the screws 9. A molding thus constructed is substantial and solid and capable of sustaining considerable weight. If greater strength is needed ribs may be formed on the metal or pressed ornamental effects may be added to the outer section.

The back section 6 is formed at certain intervals with T-shaped openings 10 to receive the stems 11 of rings 12 which are vertically disposed within the molding. These rings may be of various sizes and arranged concentrically within certain molded semi-circular effects of the front section 5 and through the rings are adapted to pass and be supported the electric wires or other wires, ropes or pipes so that they are not only hidden from view but the metal is a safe guard against fire in case of short circuiting.

In thus inclosing wires within molding they are also protected from abrasion and dampness and are easily placed in position by stringing the wires therein and then locating the T-shaped stems 11 in their openings. The front section is then placed in position inclosing the wires. The wires may be removed by reversing this operation.

It is obvious that various changes may be made in the shape of the molding, the means of attaching the two sections and other details without departing from the essential features above described.

What I claim as new and desire to secure by Letters Patent is:

1. In picture molding, the combination with a sheet metal rear section having slots and adapted to be permanently secured to the wall, of a sheet metal front section adapted to be attached to the rear section, and supports for the wires held in the slots of the rear section.

2. In picture molding, the combination with a rear non-combustible section adapted to be permanently secured to the wall and having slots, of supporting rings for wires attached to the rear section by means of the slot, and a removable front section of non-combustible material adapted to be secured to the rear section.

3. In picture molding, the combination with a rear permanently secured sheet metal section with T-shaped slots, of rings to support the wires, said rings being carried by the rear section and being engaged and held in position by said T-shaped slots and a sheet metal cover section secured to the permanent section.

4. In picture molding, the combination with a rear fireproof section adapted to be secured to a wall and having T-shaped openings, of rings having stems with cross-bars to enter the openings to secure said rings to the rear section and a front section of fire proof material with molding effect to be secured to the rear section and inclose the rings.

In testimony whereof I affix my signature in presence of two witnesses.

LEON CHOLET.

Witnesses:
   JAMES P. DUHAMEL,
   MAE W. CLINTON.